J. OLASZ.
NUTCRACKER.
APPLICATION FILED NOV. 20, 1917.
1,268,484.
Patented June 4, 1918.
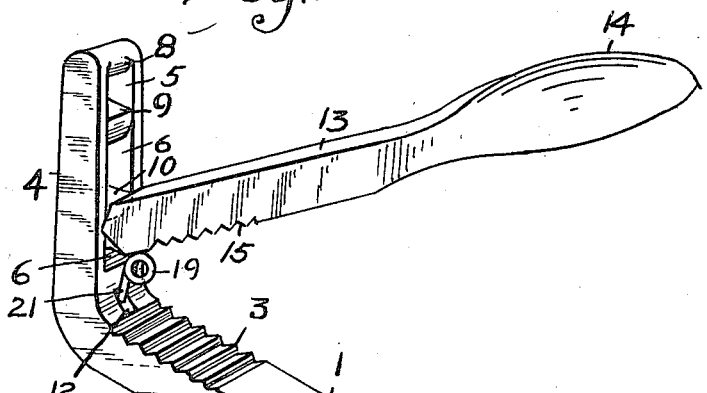
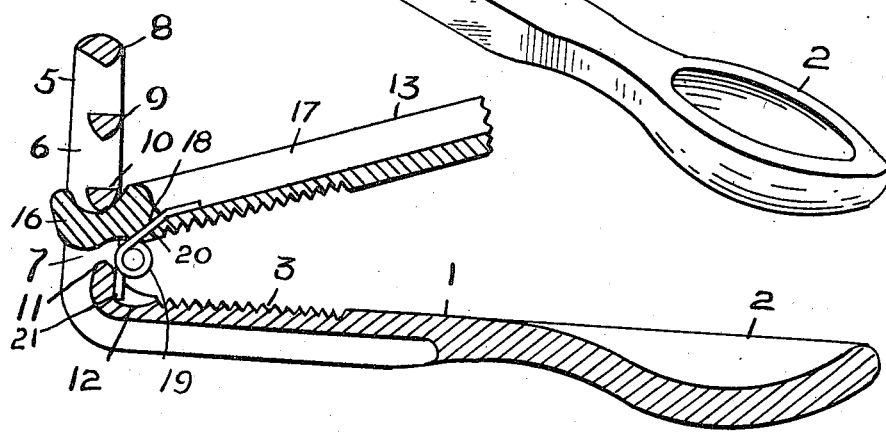
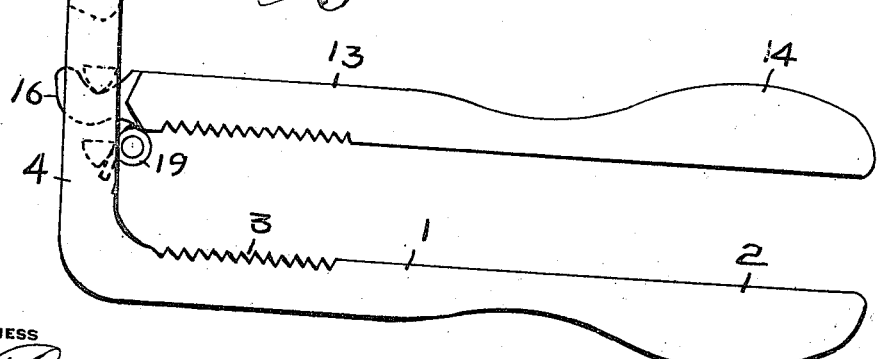
WITNESS
INVENTOR.

UNITED STATES PATENT OFFICE.

JOZSEF OLASZ, OF ALIQUIPPA, PENNSYLVANIA.

NUTCRACKER.

1,268,484.   Specification of Letters Patent.   Patented June 4, 1918.

Application filed November 20, 1917. Serial No. 202,925.

*To all whom it may concern:*

Be it known that I, JOZSEF OLASZ, a subject of the Emperor of Austria, residing at Aliquippa, in the county of Beaver and State of Pennsylvania, have invented certain new and useful Improvements in Nutcrackers, of which the following is a specification.

This invention relates to nut crackers and has for its object to provide a tool of such class, in a manner as hereinafter set forth, with an adjustable nut cracking or crushing member capable of being quickly adjusted to provide for the cracking or crushing of nuts of various sizes.

Further objects of the invention are to provide a nut cracker which is simple in its construction and arrangement, strong, durable, efficient and convenient in its use and inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:

Figure 1 is a perspective view of a nut cracker, in accordance with this invention, with the cracking or crushing element elevated.

Fig. 2 is a longitudinal sectional view.

Fig. 3 is a side elevation illustrating the cracking or crushing element adjusted.

Referring to the drawings in detail the device is comprised of a stationary and an adjustable nut cracking or crushing element. The said stationary element comprises a shank 1, provided with a handle 2, at one end and the upper face thereof at the other end serrated, as at 3, to provide a crushing or cracking jaw. Formed integral with the shank 1, at the terminus of the jaw 3, is an arm 4, which is disposed at right angles with respect to the shank 1.

The arm 4, is formed with a series of openings 5, 6, and 7, which form a series of combined abutments or fulcrums 8, 9, 10 and 11, which are V-shaped in transverse section.

At the point of mergence between the arm 4, and the shank 1, a pocket 12 is provided.

The adjustable cracking or crushing element is in the form of a lever arm, and consists of a shank 13, provided at one end with a handle 14, and having its lower face at the other end thereof serrated as at 15, to form a crushing jaw.

That end of the shank 13, having the jaw 15, is formed with a hook shaped protuberance 16.

The shank 13, is channeled as at 17, and also formed with an inclined opening 18, which terminates at one end at the channel 17, and its other end at the inner terminus of the protuberance 16.

The reference character 19, denotes a coil spring, which has one end thereof projected to extend through the opening 18, and into the channel 17, as at 20, whereby said spring 19, is secured to the shank 13. The other end of the spring 19, is also extended, as at 21, and said end is adapted to engage in the set 12, and against the abutment 11, when the protuberance 16, extends through the opening 7, and when in this latter position the abutment 10, provides a fulcrum for the adjustable crushing element. The spring 19, provides means to maintain the adjustable element normally at an upward inclination, with respect to the shank 1, whereby the nut to be crushed can be conveniently positioned between the jaws 3 and 15. The openings 5, 6, and 7 provide means whereby the shank 13, can be adjusted relatively to the shank 1, so as to enable the device acting upon nuts of various sizes. The adjustment of the shank 13, is had by positioning the protuberance 16, between the openings 5, 6 and 7; if positioned in the opening 5, the abutment 8, acts as a fulcrum, for the protuberance 16, and the extended end 21, of the spring 19, bears against the abutment 9. If the protuberance 16, is inserted in the opening 6, the abutment 9, acts as a fulcrum for the protuberance and the extended end 21, of the spring 19, bears against the abutment 10.

What I claim is:

A nut cracker comprising an angle shaped element provided with a plurality of superposed openings forming abutments and fulcrums, an adjustable element having one end provided with a protuberance capable of extending through one of said openings whereby said element can be adjustably and detachably connected to the stationary element, said protuberance when extending through an opening bearing against the fulcrum, and a spring connected to the adjustable element and having one end extended adapted to bear against the abutment when the protuberance is extended through an opening.

In testimony whereof I affix my signature in the presence of two witnesses.

JOZSEF OLASZ.

Witnesses:
MAX H. SROLOVITZ,
LUELLA H. SIMON.

Copies of this patent may be obtained for five cents each, by addressing the "Commissioner of Patents, Washington, D. C."